United States Patent
Moss

(10) Patent No.: US 10,980,172 B1
(45) Date of Patent: Apr. 20, 2021

(54) MOWER WITH AMBIDEXTROUS DECK LIFT PEDAL

(71) Applicant: Phillip Mark Moss, Springfield, TN (US)

(72) Inventor: Phillip Mark Moss, Springfield, TN (US)

(*) Notice: Subject to any disclaimer, the term of this patent is extended or adjusted under 35 U.S.C. 154(b) by 0 days.

(21) Appl. No.: 17/076,659

(22) Filed: Oct. 21, 2020

Related U.S. Application Data

(60) Provisional application No. 62/974,231, filed on Nov. 20, 2019.

(51) Int. Cl.
*A01D 34/74* (2006.01)
*A01D 101/00* (2006.01)

(52) U.S. Cl.
CPC .......... *A01D 34/74* (2013.01); *A01D 2101/00* (2013.01)

(58) Field of Classification Search
CPC .... A01D 34/74; A01D 34/661; A01D 34/662; A01D 2101/00
See application file for complete search history.

(56) References Cited

U.S. PATENT DOCUMENTS

| | | | | |
|---|---|---|---|---|
| 6,530,200 B1* | 3/2003 | Minoura | ................ | A01D 34/64 56/15.2 |
| 6,588,188 B2* | 7/2003 | Dennis | ................... | A01D 34/74 56/14.9 |
| 7,013,626 B1* | 3/2006 | Strope | ................... | A01D 34/68 56/15.8 |
| 7,197,863 B1 | 4/2007 | Sugden | | |
| 7,540,134 B1* | 6/2009 | Reich | ..................... | A01D 34/74 56/17.1 |
| 7,540,135 B2* | 6/2009 | Strope | ................... | A01D 34/74 56/14.9 |
| 7,578,117 B2* | 8/2009 | Shaffer | ................. | A01D 34/74 56/17.1 |
| 7,587,886 B1 | 9/2009 | Sugden | | |
| 7,857,089 B1 | 12/2010 | Sugden | | |
| 9,445,543 B2* | 9/2016 | Berglund | ............... | A01D 34/64 |
| 10,694,665 B2* | 6/2020 | Lapp | ...................... | A01D 34/74 |
| 2002/0088217 A1* | 7/2002 | Dennis | ................... | A01D 34/74 56/15.8 |
| 2003/0094071 A1* | 5/2003 | Eavenson, Sr. | .......... | G05G 1/30 74/562 |
| 2007/0012016 A1* | 1/2007 | Strope | ................... | A01D 34/74 56/17.1 |
| 2008/0034723 A1* | 2/2008 | Wright | .................. | A01D 34/74 56/17.1 |

(Continued)

*Primary Examiner* — Adam J Behrens
(74) *Attorney, Agent, or Firm* — Waller Lansden Dortch & Davis, LLP; Matthew C. Cox

(57) ABSTRACT

A zero-turn style lawnmower includes a frame, a foot platform on the frame and a deck positioned below the foot platform. A foot bar spans above the foot platform. The foot bar is attached at one end to a right pedal arm on the right side of the frame and at the opposite end to a left pedal arm on the left side of the frame. The right pedal arm extends upwardly from a right front lift bracket pivotally attached to the right side of the frame, and the left pedal arm extends upwardly from a left front lift bracket pivotally attached to the left side of the frame. A user may press a right foot, left foot or both feet simultaneously on the foot bar to raise or lower the deck.

15 Claims, 14 Drawing Sheets

(56) References Cited

U.S. PATENT DOCUMENTS

| | | | |
|---|---|---|---|
| 2008/0229725 A1* | 9/2008 | Shaffer | A01D 34/74 56/17.1 |
| 2010/0011733 A1* | 1/2010 | Godfrey | A01D 34/662 56/17.5 |
| 2014/0083069 A1* | 3/2014 | Berglund | A01D 34/661 56/14.7 |
| 2014/0083070 A1* | 3/2014 | Berglund | A01D 34/74 56/14.7 |
| 2017/0223892 A1* | 8/2017 | Snapp | A01D 34/661 |
| 2018/0077859 A1* | 3/2018 | Sutton | A01D 34/828 |
| 2019/0289783 A1* | 9/2019 | Welz | A01D 34/661 |
| 2019/0387676 A1* | 12/2019 | Welz | A01D 34/661 |
| 2020/0022303 A1* | 1/2020 | Gindt | B60N 2/38 |
| 2020/0329637 A1* | 10/2020 | Clontz | A01D 34/74 |

\* cited by examiner

MOWER WITH AMBIDEXTROUS DECK LIFT PEDAL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of and claims priority to and benefit of U.S. Provisional Patent Application No. 62/974,231 filed Nov. 20, 2019, all of which is hereby incorporated by reference in its entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

The present disclosure relates generally to lawnmowers and more particularly to zero-turn style lawnmowers having a deck lift pedal to raise and lower a cutting deck.

Conventional zero-turn style lawnmowers typically include a cutting deck that can be raised or lowered to a desired mowing height using a single foot pedal. The cutting deck may be lowered by releasing a latch and lowering the cutting deck using the foot pedal and gravity. The cutting deck may be raised by pushing the foot pedal forward, thereby lifting the deck until the latch re-engages in a raised position. Conventional zero-turn style lawnmowers include a single foot pedal mounted on the right side of the mower connected to the deck support linkage. The foot pedal may be actuated with a user's right foot when the user is sitting in a seat on the lawnmower.

Conventional zero-turn style lawnmowers are problematic because the deck lift foot pedal may only be operated with one foot. Some users, such as elderly or young operators may be too weak to properly operate the deck lift foot pedal with just one foot. Similarly, users that have had accidents or health issues affecting their right leg may be unable to operate the deck lift foot pedal on conventional zero-turn style lawnmowers. For example, athletic accidents, car accidents, amputations or strokes may render a user unable to operate a deck lift foot pedal on a conventional zero-turn style lawnmower.

Another problem with conventional zero-turn style lawnmowers is that placement of the deck lift foot pedal on one side of the frame causes a mechanical moment to be applied to the frame when a user exerts force on the deck lift foot pedal, causing the frame to torque in an uneven manner. Such uneven distribution of force causes the seat to experience a corresponding uneven application of force, thereby resulting in a broken or damaged seat and broken or damaged seat mounts.

What is needed then is an improved zero-turn style lawnmower with a raise and lower mechanism for a cutting deck that may be operated with a right foot, a left foot or both feet.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a lawnmower apparatus including a foot bar extending above the foot platform from side to side to allow a user to raise or lower the deck using a right foot, left foot or both feet. The foot bar also provides a place for a user to rest their feet while mowing.

Another aspect of the disclosure is a kit to retrofit an existing lawnmower to remove a one-sided foot pedal and to install a right pedal arm, a left pedal arm and a foot bar spanning above the foot platform between the right pedal arm an left pedal arm.

Numerous other objects, advantages and features of the present disclosure will be readily apparent to those of skill in the art upon a review of the following drawings and description of a preferred embodiment.

DETAILED DESCRIPTION

Figure 1:
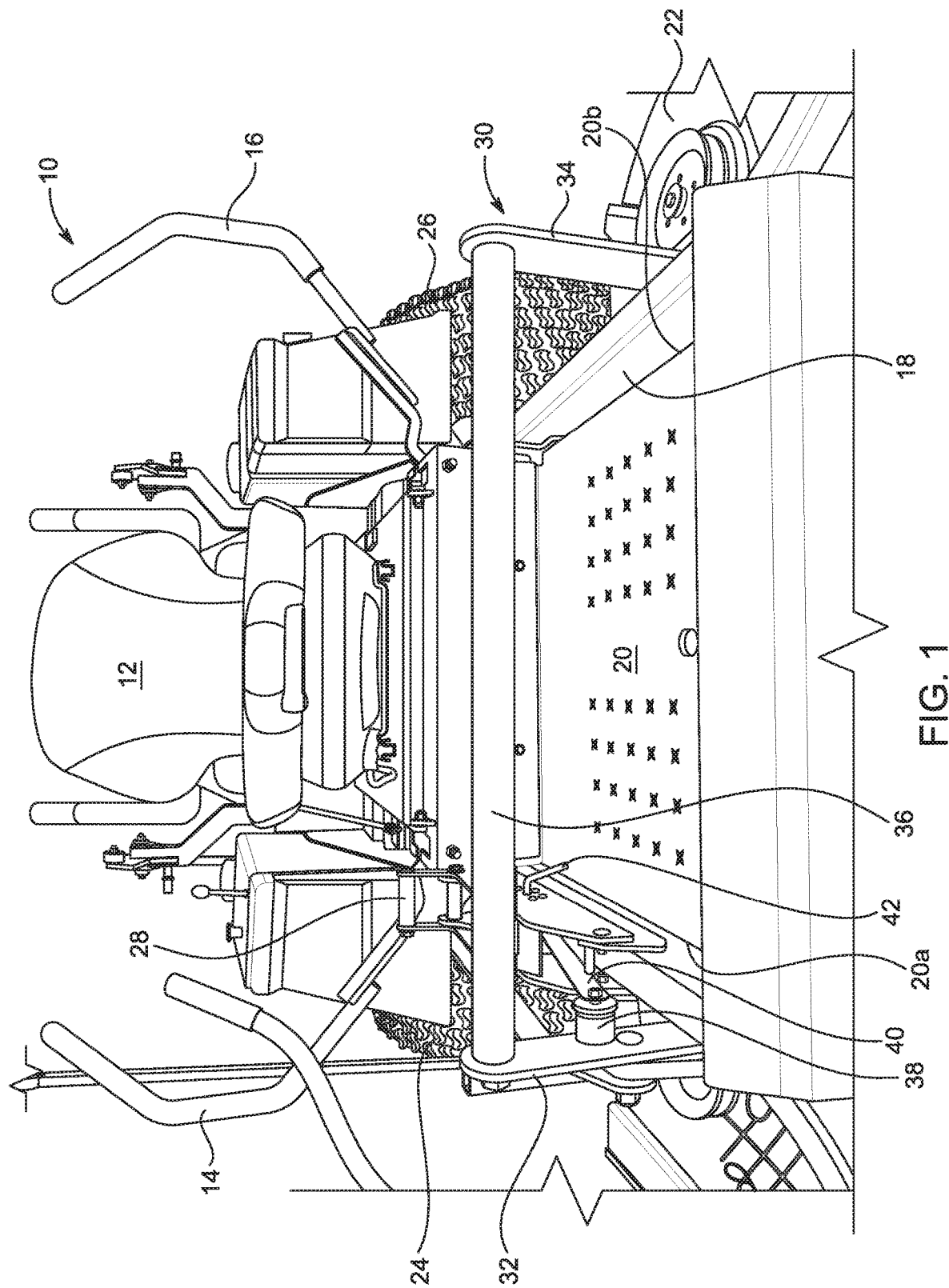
FIG. 1 is a front perspective view of a lawnmower apparatus with an ambidextrous deck lift foot pedal.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Referring to FIG. 1, an embodiment of a zero-turn style lawnmower apparatus 10 is illustrated. Lawnmower apparatus 10 includes a seat 12, a first handle 14, a second handle 16, a frame 18, a foot platform 20, a cutting deck 22, a right rear wheel 24 and a left rear wheel 26. Foot platform 20 is positioned on frame 18, and includes a right side 20a and a left side 20b. The cutting deck 22 is positioned below the foot platform 20. Cutting deck 22 can be selectively raised or lowered relative to frame 18 to cut grass at different heights. A deck latch 28 is positioned on frame 18. Deck latch 28 may be released to lower cutting deck 22 to a lowered position. Deck latch 28 may be engaged to raise cutting deck 22 to a raised position. A deck latch pin 42 may be installed on deck latch 28 to set the height of the deck 22 when in the lowered position. A plurality of deck height holes are defined in deck latch 28 to provide pre-determined height settings for deck 22.

Referring further to FIG. 1, a foot bar assembly 30 including an ambidextrous deck lift foot bar 36 is positioned on the lawnmower 10. Foot bar 36 spans across frame 18 above the foot platform 20. Foot bar 36 includes a cylindrical metal rod in some embodiments. Foot bar 36 includes a knurled, grooved, dimpled or textured surface to provide traction in some embodiments. In other embodiments, foot bar 36 may include traction tape, studs or other structures disposed thereon to provide traction in additional embodiments.

Foot bar 36 is secured to the lawnmower 10 by a right pedal arm 32 on the right side of the mower and a left pedal arm 34 on the left side of the mower. Right pedal arm 32 extends in an upward direction above foot platform 20, and left pedal arm 34 also extends in an upward direction above foot platform 20 generally parallel to right pedal arm 32 in some embodiments. In some embodiments, foot bar 36 includes a length that is greater than the lateral width of foot platform 20 from first edge 20a to second edge 20b. Foot bar 36 includes a length of about 25 to 35 inches in some embodiments. In other embodiments, foot bar 36 includes a length of about 30 inches. In other embodiments, foot bar 36 has any suitable length to provide a foot bar spanning across the front of the mower from side to side to allow a user to operate the foot bar with a right foot, a left foot or both feet.

A latch rod 40 extends from deck latch 28 to the foot bar assembly 30 to limit the travel of the foot bar assembly 30 according to the position defined by pin 42. In some embodiments, latch rod 40 is secured to right pedal arm 32 at a rod mount 38 positioned below foot bar 36 on right pedal arm 32. Rod mount 38 includes a threaded boss configured to receive a fastener in some embodiments.

Figure 2:
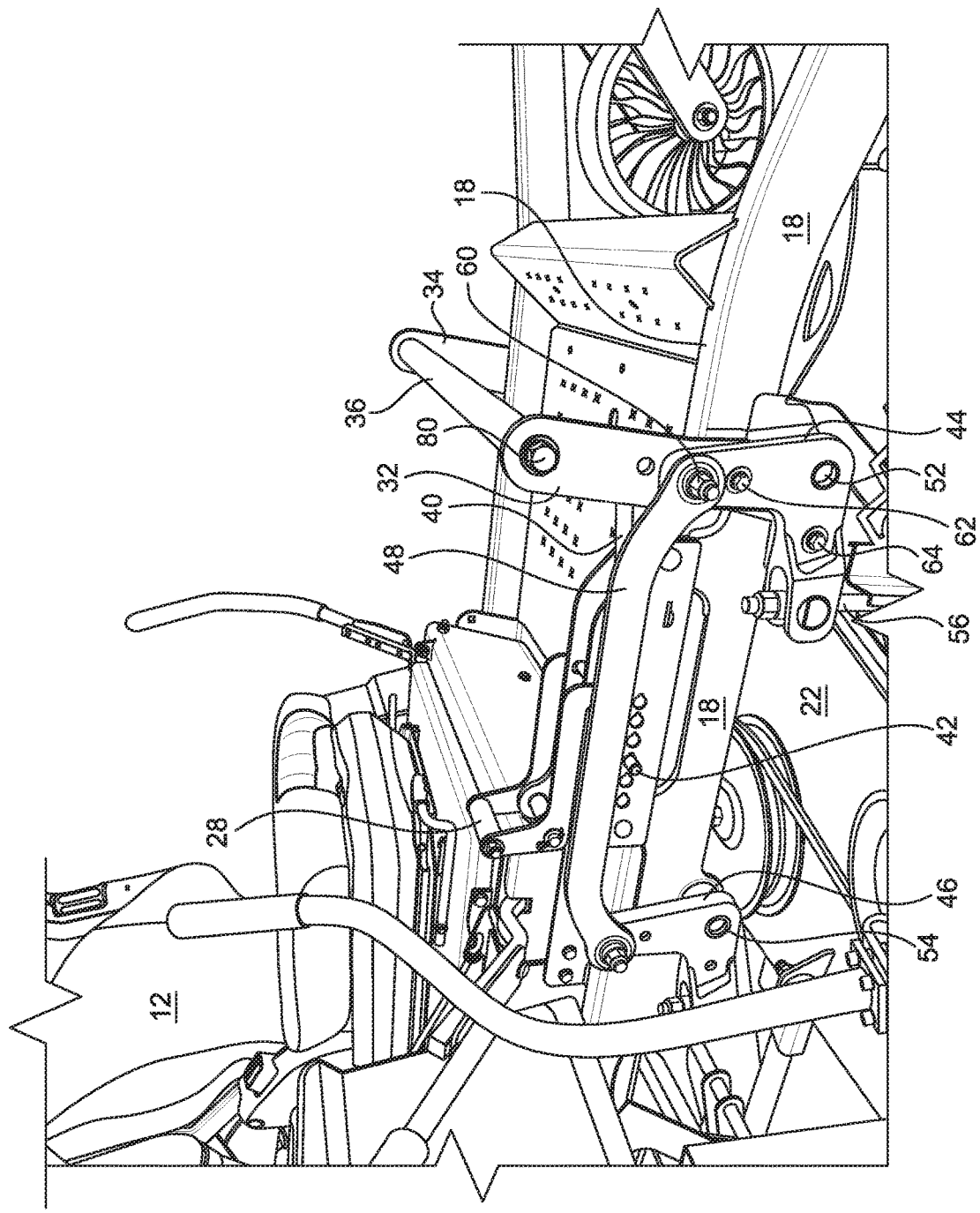
FIG. 2 is a right side perspective view of a lawnmower apparatus with an ambidextrous deck lift foot pedal.

Referring to FIG. 2, a right side perspective view of a lawnmower apparatus 10 is shown. Right pedal arm 32 is secured to a right front lift bracket 44 that is pivotally attached to frame 18 at right front pivot 52. Right front lift bracket 44 provides a pivotable linkage between foot bar 36 and deck 22. More specifically, right front lift bracket 44 is attached to a right front deck hanger 56 in the form of a vertical rod extending upwardly from deck 22. Right pedal arm 32 is secured to right front lift bracket 44, extending upwardly away from right front pivot 52. Right pedal arm 32 is secured to right front lift bracket 44 using a first right fastener 60, a second right fastener 62 and a third right fastener 64. As such, right pedal arm 32 is securely fixed to right front lift bracket 44. When foot bar 36 is pushed forward, right front lift bracket 44 pivots relative to right front pivot 52, causing right front deck hanger 56 to be lifted upwardly in a corresponding motion to the pivoting motion of right front lift bracket 44. Such movement causes deck 22 to be raised.

Also shown in FIG. 2, a lift linkage 48 spans between right front lift bracket 44 and right rear lift bracket 46, which is also pivotally attached to frame 18 at right rear pivot 54. Lift linkage 48 transfers movement of foot bar 36 to right rear lift bracket 46, which then pivots and raises a right rear deck hanger to provide an equivalent amount of upward motion on the rear right portion of deck 22.

Figure 3:
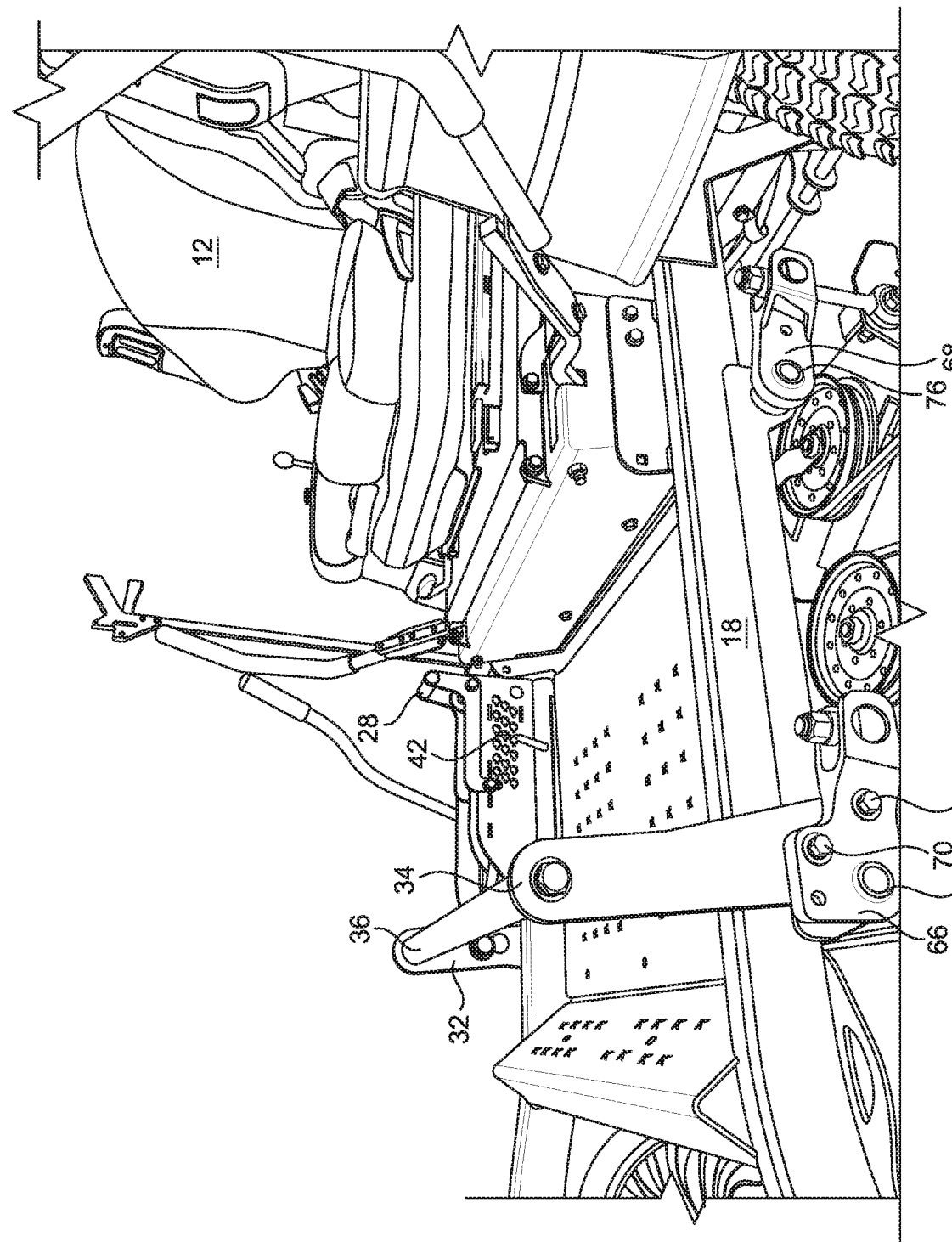
FIG. 3 is a left side perspective view of a lawnmower apparatus with an ambidextrous deck lift foot pedal.

Referring to FIG. 3, a left side perspective view of a lawnmower apparatus 10 is shown. Left pedal arm 34 is secured to a left front lift bracket 66 that is pivotally attached to frame 18 at left front pivot 74. Left front lift bracket 66 provides a pivotable linkage between foot bar 36 and deck 22. More specifically, left front lift bracket 66 is attached to a left front deck hanger in the form of a vertical rod extending upwardly from deck 22. Left pedal arm 34 is secured to left front lift bracket 66, extending upwardly away from left front pivot 74. Left pedal arm 34 is secured to left front lift bracket 66 using a first left fastener 70 and a second left fastener 72 in some embodiments. As such, left pedal arm 34 is securely fixed to left front lift bracket 66. When foot bar 36 is pushed forward, left front lift bracket 66 pivots relative to left front pivot 74, causing a left front deck hanger to be lifted upwardly in a corresponding motion to the pivoting motion of left front lift bracket 66. Such movement causes deck 22 to be raised on the left side of the lawnmower. Also shown in FIG. 3, a left rear lift bracket 68 is also pivotally attached to frame 18 at left rear pivot 76. A left rear deck hanger connects left rear lift bracket 68 to deck 22.

Figure 4:
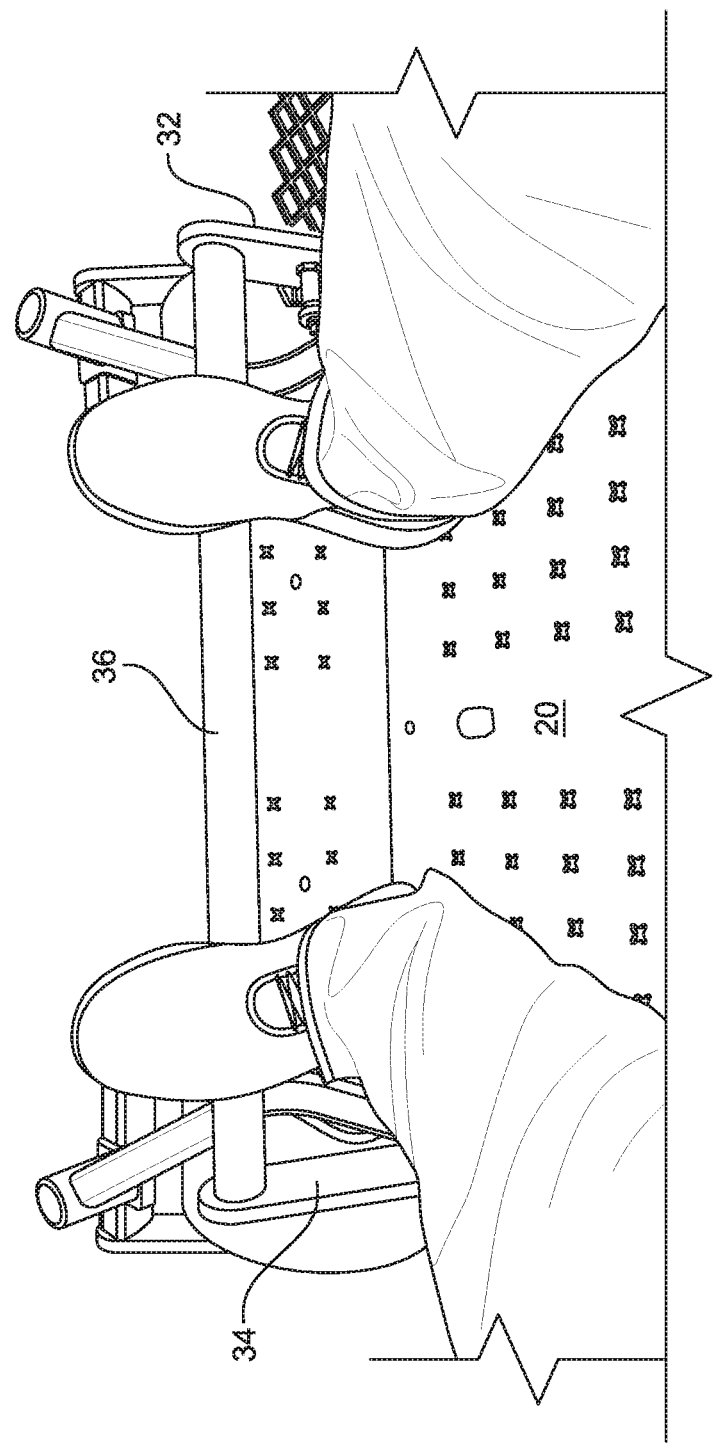
FIG. 4 is a rider point of view perspective view of a lawnmower apparatus with an ambidextrous deck lift foot pedal.

Referring now to FIG. 4, a point of view perspective is illustrated showing a user's right and left feet positioned on foot bar 36. During use, a user may rest both feet on the foot bar 36 spanning across and above the foot platform 20 while operating the mower. Additionally, the user may use both feet to push on the foot bar 36 to release the deck latch and to raise or lower the deck relative to the frame. By pushing on foot bar 36 with both feet, as shown in FIG. 4, a similar amount of force is applied simultaneously to both right pedal arm 32 and left pedal arm 34, there by equalizing the force application across the frame and preventing unequal forces on the seat and the seat mounts. Additionally, by using both feet to push on foot bar 36, a user reduces the effective pressure on each foot by one-half as compared to operating a conventional foot pedal with only one foot. This allows users who cannot operate conventional one-sided foot pedals to operate a deck lift pedal using one or both feet in the many different positions offered by the foot bar 36 spanning across and above foot platform 20 from side to side.

Figure 5:
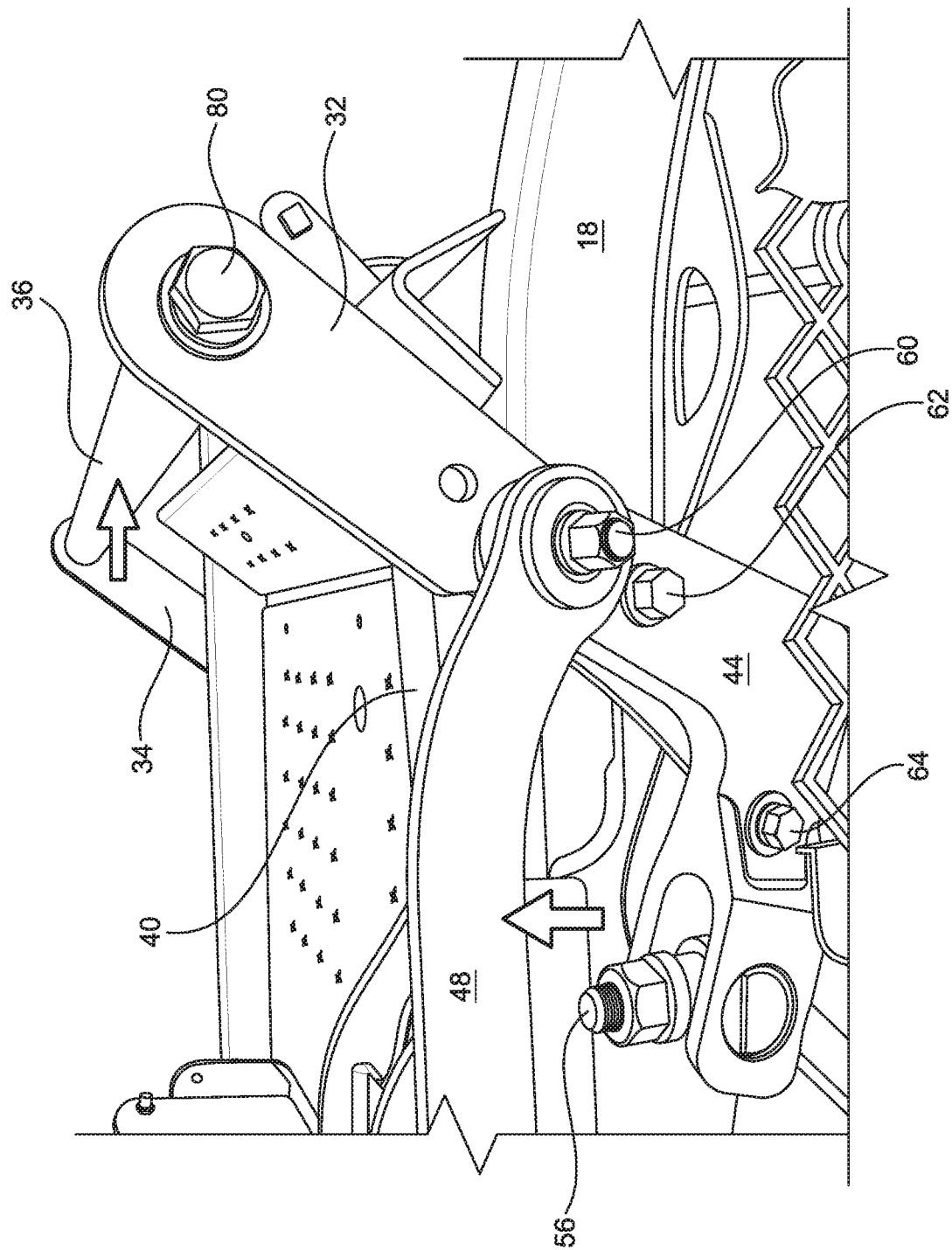
FIG. 5 is a detail right side perspective view of a lawnmower apparatus with an ambidextrous deck lift foot pedal.
Figure 11:
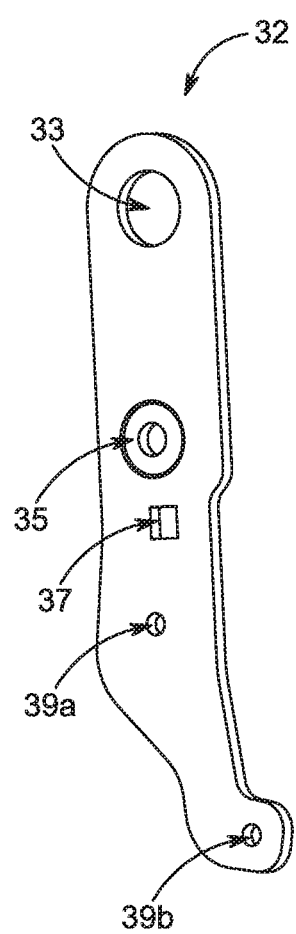
FIG. 11 is a perspective view of a right pedal arm.
Figure 12:
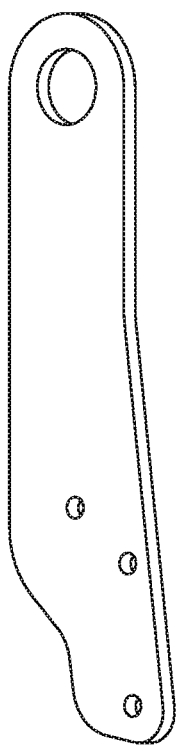
FIG. 12 is a perspective view of a left pedal arm.
Figure 14A:
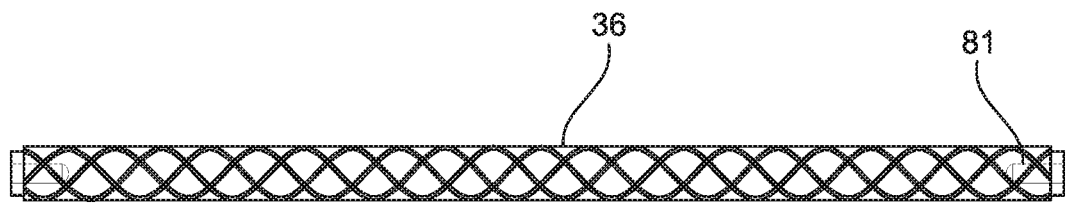
FIG. 14a is a schematic view of a foot bar.
Figure 14B:
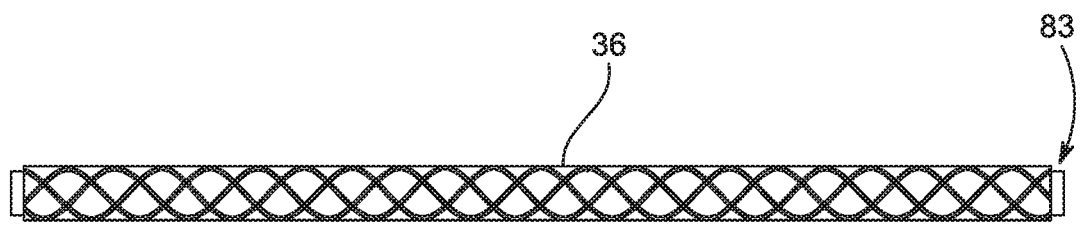
FIG. 14b is a front view of a foot bar.

A detail view of the right side of the lift assembly is shown in FIG. 5. Foot bar 36 is secured to right pedal arm 32 using a first bar fastener 80. In some embodiments, first bar fastener 80 is a threaded bolt extending through a bar hole 33 defined in right pedal arm 32, as shown in FIGS. 11 and 14. In some embodiments, foot bar 36 includes a stepped end with a slightly reduced diameter that fits inside receiver hole 33 defined in right pedal arm 32. First bar fastener 80 engages a threaded socket 81 defined in the end of foot bar 36. As such, bar fastener 80 along with the mechanical seating of the stepped end in receiver hole 33 provides a rigid connection between the right end of foot bar 36 and right pedal arm 32. A similar connection is provided on the left end of foot bar 36 to secure foot bar 36 to the left pedal arm 34.

Referring further to FIG. 5, right pedal arm 32 may be secured to right front lift bracket 44 using one, two or three attachment points. In some embodiments, right front lift bracket 44 includes pre-defined attachment holes, and right pedal arm 32 may be installed as an attachment to retrofit an existing mower that did not include the right pedal arm 32. In alternative embodiments, right front bracket 44 and right pedal arm 32 comprise a single piece wherein the upper portion of right front bracket 44 extending above right front pivot extends above lift linkage such that foot bar 36 is attached directly to the upwardly protruding portion of right front lift bracket 44.

Referring further to FIG. 5, a first attachment point between right pedal arm 32 and right front lift bracket 44 is provided at first fastener 60. In some embodiments, a first attachment hole 37 is defined through right pedal arm 32, and first fastener 60 passes through first attachment hole 37 and also through a hole defined in the right front lift bracket 44. As such, first fastener 60 mechanically attaches right pedal arm 32 to right front lift bracket 44. In some embodiments, first attachment hole 37 is a square hole and is dimensioned to receive a corresponding square boss protruding from the inside surface of right front lift bracket 44. In other embodiments, first attachment hole 37 may include a round hole. Also, as shown in FIG. 5, in some embodiments, lift linkage 48 is also secured to both right pedal arm 32 and right front lift bracket 44 using first fastener 60.

Referring further to FIG. 5, a second attachment point between right pedal arm 32 and right front lift bracket 44 is provided at second fastener 62. In some embodiments, a second attachment hole 39a is defined through right pedal arm 32, and second fastener 62 passes through second attachment hole 39a and also through a hole defined in the right front lift bracket 44. The second attachment point is between right front pivot 52 and first fastener 60.

Referring further to FIG. 5, a third attachment point between right pedal arm 32 and right front lift bracket 44 is provided at third fastener 64. In some embodiments, a third attachment hole 39b is defined through right pedal arm 32, and third fastener 64 passes through third attachment hole 39b and also through a hole defined in the right front lift bracket 44. The third attachment point is between right front pivot 52 and first deck hanger 56. As indicated by the arrows in FIG. 5, when foot bark 36 is pushed forward, first deck hanger 56 rises due to the pivoting movement of right front lift bracket 44 relative to right front pivot.

In other embodiments, right pedal arm 32 may be welded onto the right front lift bracket 44 or secured to right front lift bracket 44 using any suitable attachment mode.

Figure 6:
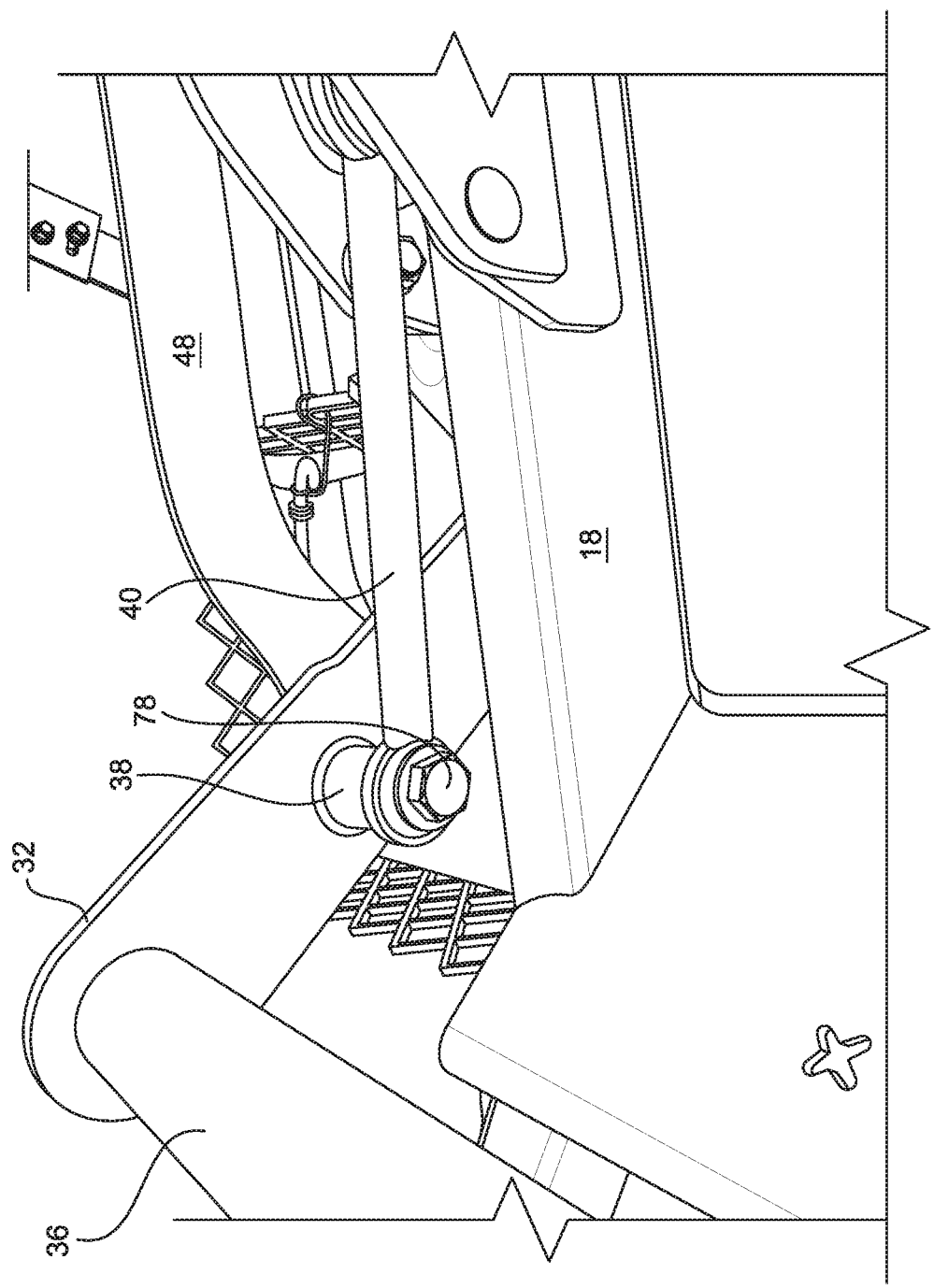
FIG. 6 is a detail right side perspective view of a lawnmower apparatus with an ambidextrous deck lift foot pedal.
Figure 7:
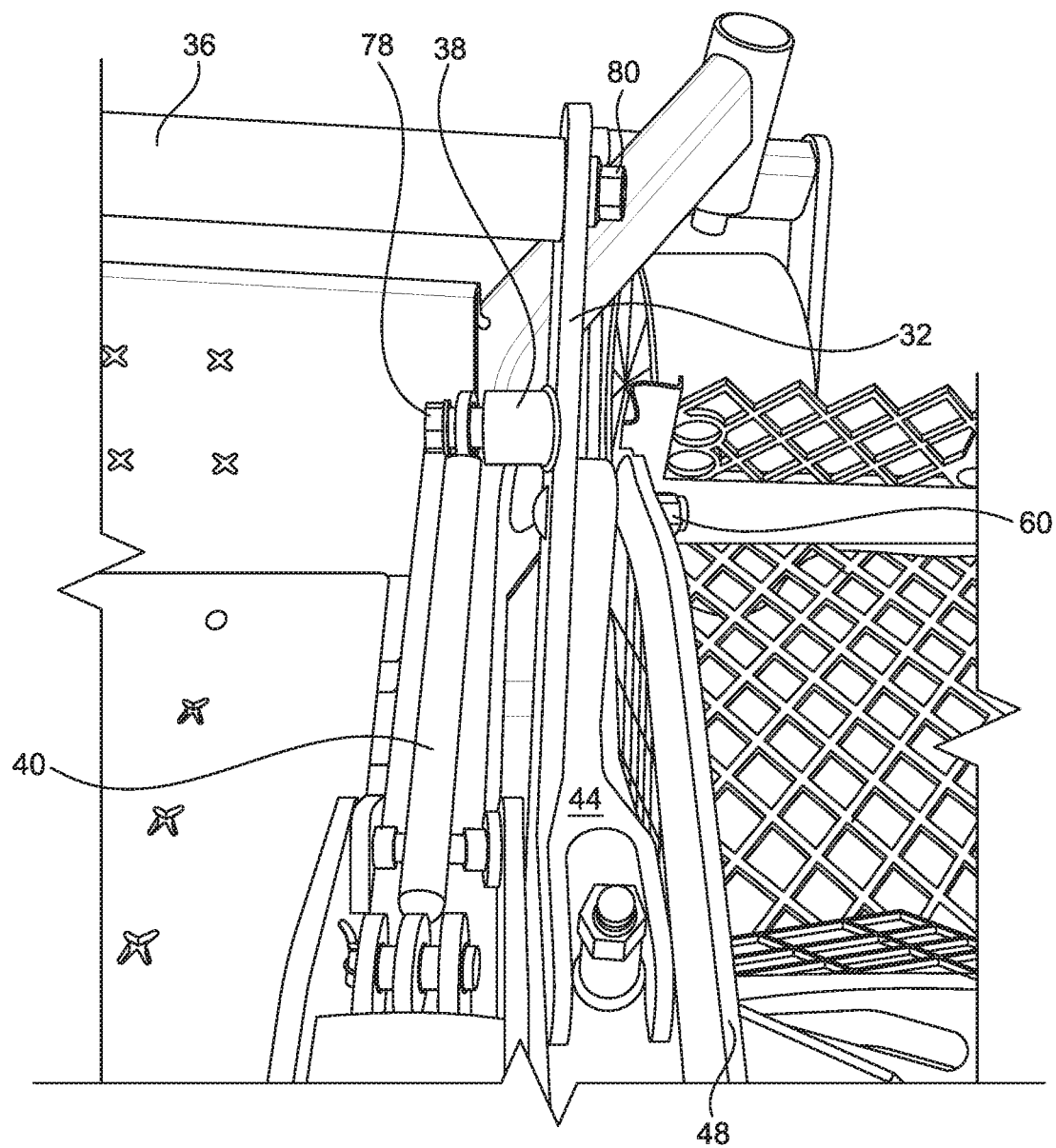
FIG. 7 is a detail top view of a right side of a lawnmower apparatus with an ambidextrous deck lift foot pedal.
Figure 13:
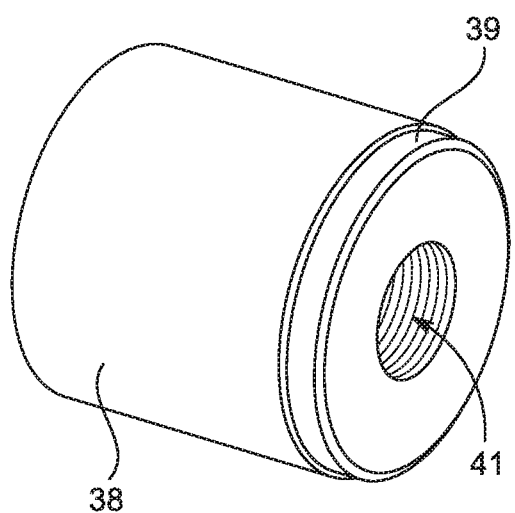
FIG. 13 is a perspective view of a rod mount.

Referring to FIGS. 6 and 7, a detail perspective view of the inside surface of the right pedal arm 32 and a top view of the right pedal arm are shown. In some embodiments, latch rod 40 is attached to right pedal arm 32 at a rod mount 38. In some embodiments, rod mount 38 includes a threaded boss, as shown in FIG. 13, welded onto right pedal arm 32. In some embodiments, rod mount 38 includes a step on its axial end comprising a reduced diameter, and right pedal arm 32 includes a recess that the step seats into, as shown in FIG. 11. A mount hole 35 is defined through right pedal arm 32 aligned with rod mount 38 in some embodiments. Rod mount 38 includes a threaded bore, and a rod fastener 78 passes through the end of latch rod 40 into the threaded bore. In some embodiments, a bushing or bearing is positioned between rod mount 38 and rod fastener 78 to provide a pivotable attachment between latch rod 40 and right pedal arm 32 to better facilitate travel of latch rod 40.

Figure 8:
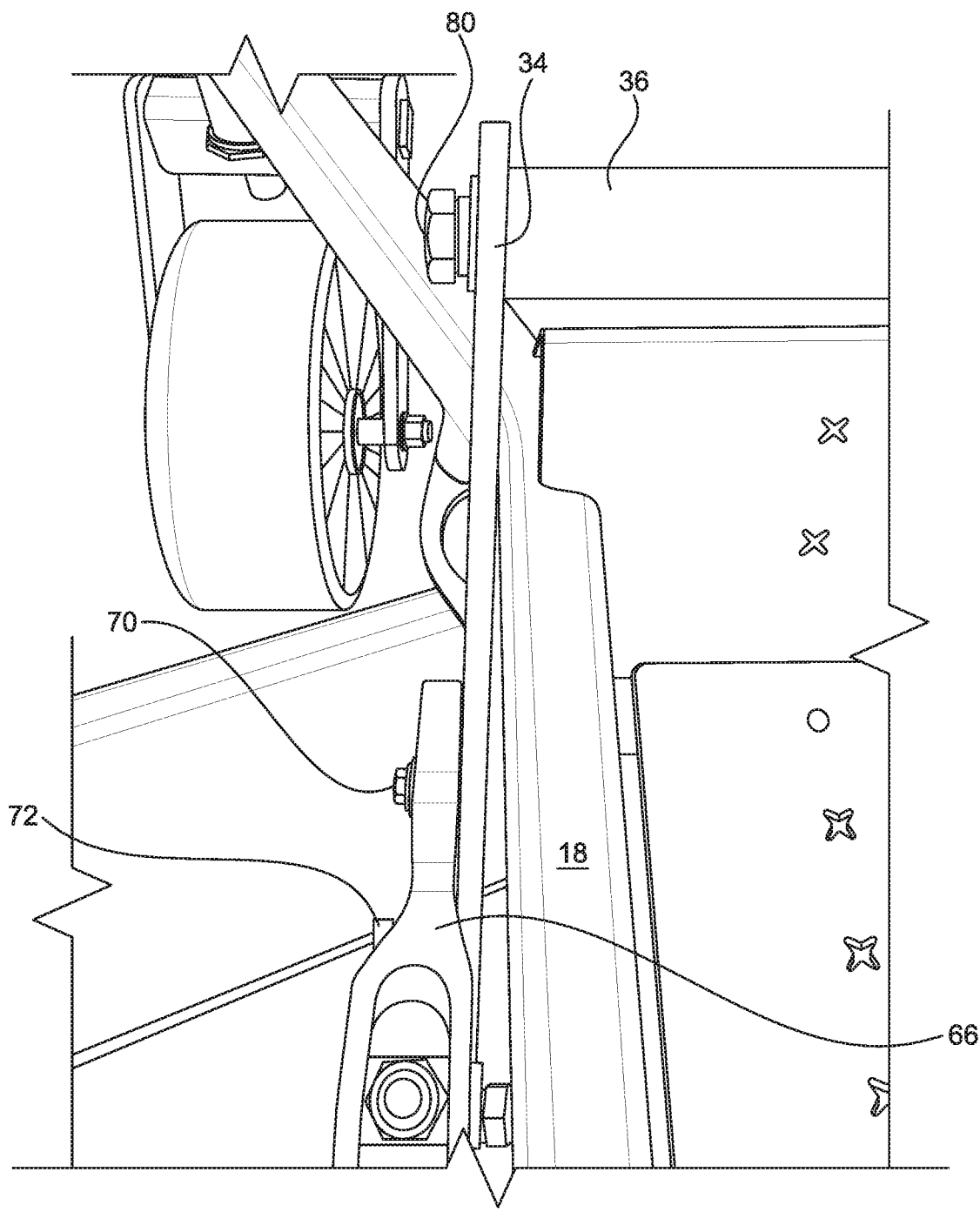
FIG. 8 is a detail top view of a left side of a lawnmower apparatus with an ambidextrous deck lift foot pedal.

Referring again to FIG. 3, FIG. 8 and FIG. 10, left pedal arm 34 may be secured to left front lift bracket 66 using one, two or three attachment points. In some embodiments, left front lift bracket 66 includes pre-defined attachment holes, and left pedal arm 34 may be installed as an attachment to retrofit an existing mower that did not include the left pedal arm 34. In alternative embodiments, left front bracket 66 and left pedal arm 34 comprise a single piece wherein the upper portion of left front bracket 66 extending above left front pivot 74 extends above the foot platform 20 such that foot bar 36 is attached directly to the upwardly protruding portion of left front lift bracket 66. In further embodiments, left pedal arm 34 is welded onto left front bracket 66 or attached to left front bracket 66 using any suitable attachment mode.

Figure 9:
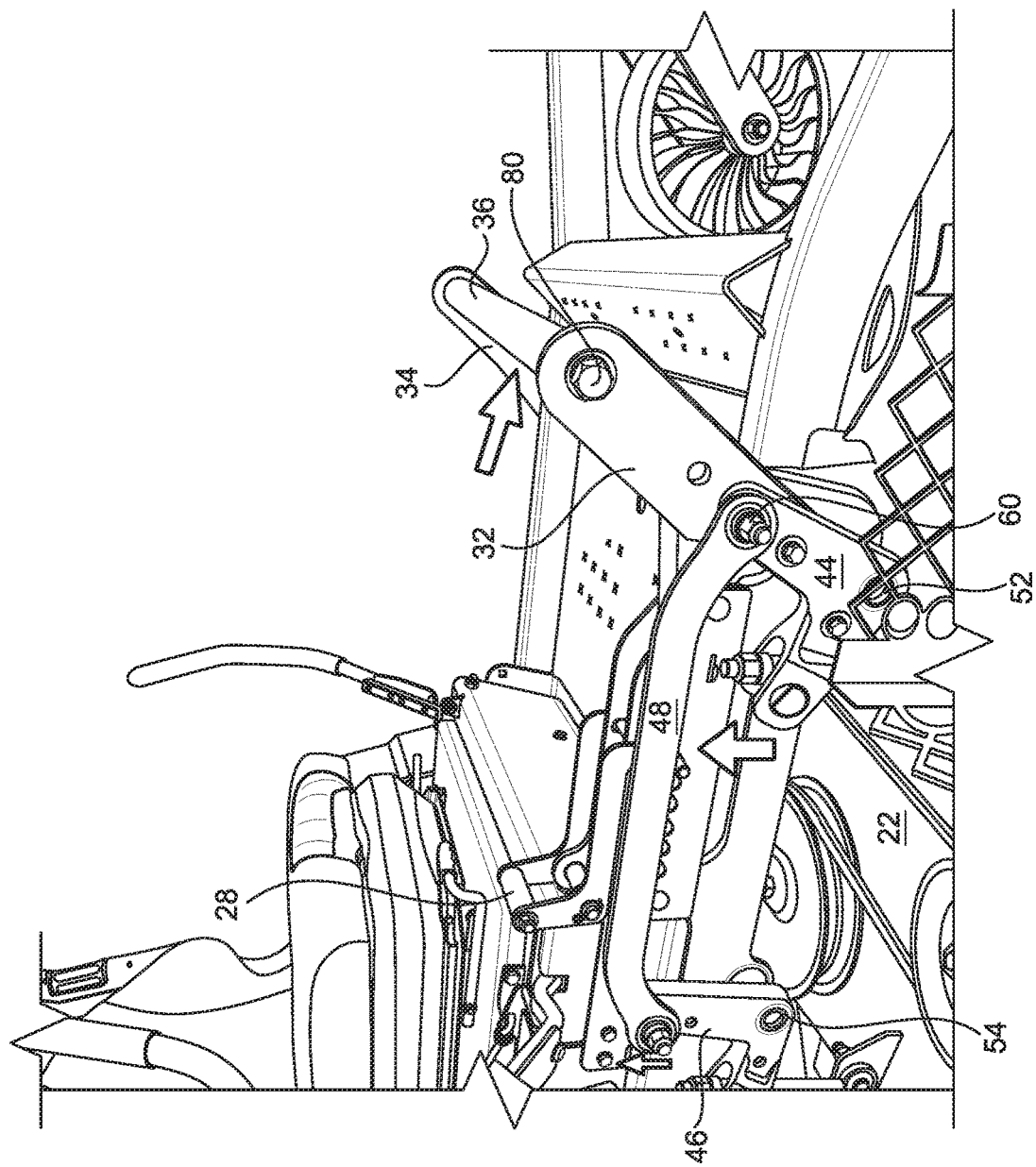
FIG. 9 is a right side perspective view of a lawnmower apparatus with an ambidextrous deck lift foot pedal in a raised position.
Figure 10:
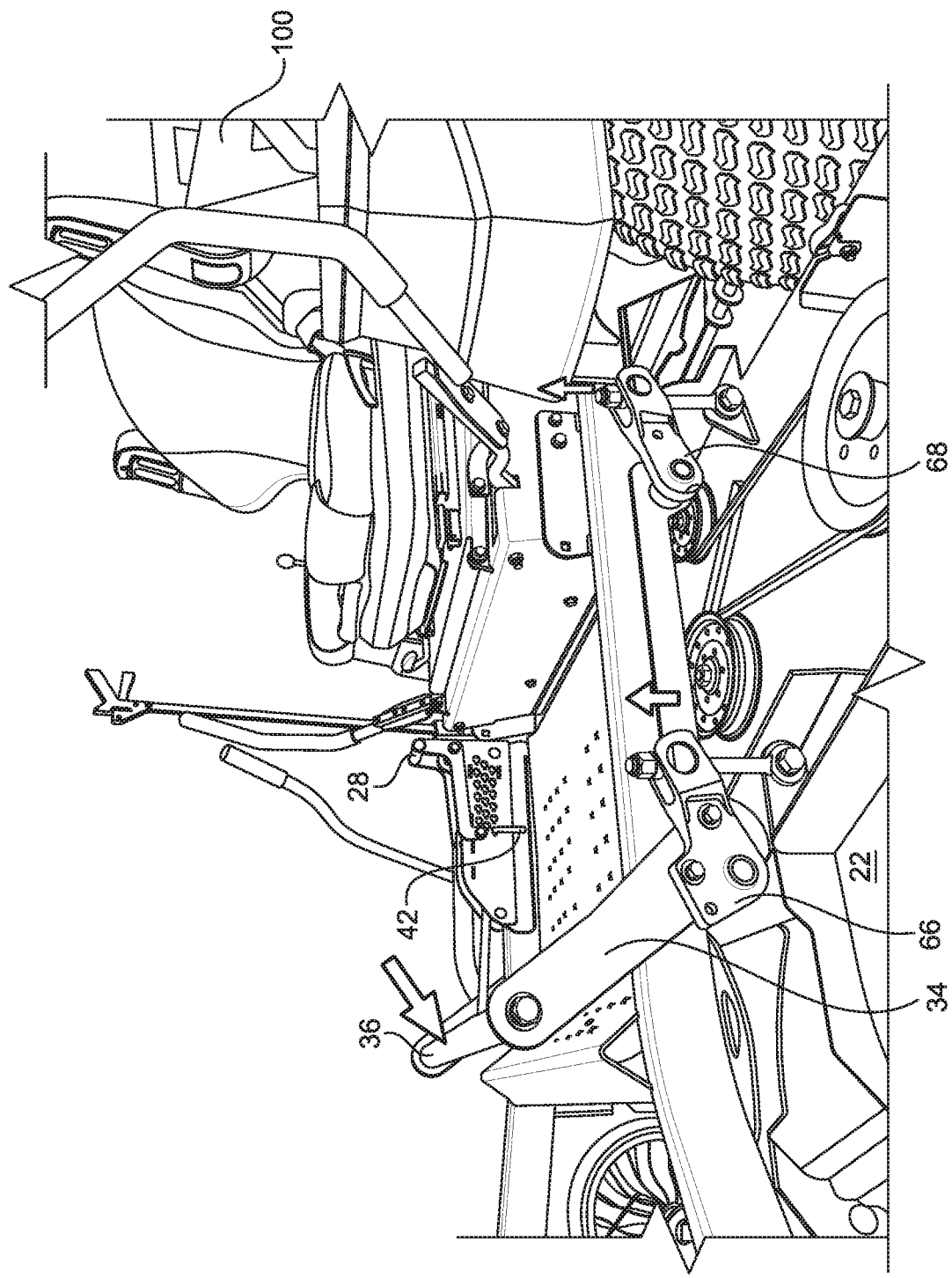
FIG. 10 is a left side perspective view of a lawnmower apparatus with an ambidextrous deck lift foot pedal in a raised position.

Referring to FIG. 9 and FIG. 10, when foot bar 36 is pushed forward, deck 22 may be lifted to a raised position.

Thus, although there have been described particular embodiments of the present invention of a new and useful AMBIDEXTROUS MOWER DECK LIFT PEDAL, it is not intended that such references be construed as limitations upon the scope of this invention.

What is claimed is:

1. A lawnmower apparatus, comprising:
   a frame;
   a seat positioned on the frame;
   a motor disposed on the frame;
   a foot platform disposed on the frame, the foot platform having a right edge and a left edge;
   a cutting deck disposed on the frame below the foot platform;
   a right front lift bracket pivotally attached to the frame and linked to the cutting deck;
   a left front lift bracket pivotally attached to the frame and linked to the cutting deck;
   a right pedal arm extending upwardly from the right front lift bracket;
   a left pedal arm extending upwardly from the left front lift bracket; and
   a foot bar extending between and attached to both the right pedal arm and the left pedal arm above the foot platform.

2. The apparatus of claim 1, further comprising the foot bar having a length greater than the distance between the right and left edges of the foot platform.

3. The apparatus of claim 2, wherein the foot platform is positioned entirely between the right pedal arm and the left pedal arm.

4. The apparatus of claim 3, wherein the right pedal arm is attached to the right front lift bracket using one or more fasteners.

5. The apparatus of claim 4, wherein the left pedal arm is attached to the left front lift bracket using one or more fasteners.

6. The apparatus of claim 3, wherein the right pedal arm is welded to the right front lift bracket.

7. The apparatus of claim 6, wherein the left pedal arm is welded to the left front lift bracket.

8. The apparatus of claim 3, wherein the right pedal arm is integrally formed on the right front lift bracket as a single piece.

9. The apparatus of claim 8, wherein the left pedal arm is integrally formed on the left front lift bracket as a single piece.

10. The apparatus of claim 1, further comprising a rod mount disposed on the right pedal arm.

11. The apparatus of claim 10, further comprising a latch rod attached to the rod mount.

12. The apparatus of claim 11, wherein the foot bar is operable to raise and lower the deck.

13. The apparatus of claim 12, further comprising a deck latch disposed on the frame, wherein the deck latch is selectively operable to latch the deck in a raised position and to release the deck to a lowered position.

14. The apparatus of claim 13, wherein the latch rod is attached to the deck latch.

15. The apparatus of claim 14, wherein the latch rod is pivotally attached to the rod mount on the right pedal arm.

* * * * *